(12) United States Patent
De Armas et al.

(10) Patent No.: US 6,611,878 B2
(45) Date of Patent: *Aug. 26, 2003

(54) METHOD AND APPARATUS FOR SOFTWARE TECHNOLOGY INJECTION FOR OPERATING SYSTEMS WHICH ASSIGN SEPARATE PROCESS ADDRESS SPACES

(75) Inventors: Mario E. De Armas, West Palm Beach, FL (US); Edward D. Shockley, Boynton Beach, FL (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/747,040

(22) Filed: Nov. 8, 1996

(65) Prior Publication Data

US 2003/0110307 A1 Jun. 12, 2003

(51) Int. Cl.$^7$ .............................. G06F 9/00; G06F 9/46
(52) U.S. Cl. ......................... 709/328; 709/331
(58) Field of Search ................................. 395/157, 798, 395/680, 882, 700, 650, 200, 500; 710/62; 709/300, 328, 331, 313, 310, 329; 704/275

(56) References Cited

U.S. PATENT DOCUMENTS 5,204,947 A * 4/1993 Bernstein et al. ............ 395/157
5,274,815 A   12/1993 Trissel et al. ................ 395/700

(List continued on next page.)

FOREIGN PATENT DOCUMENTS

WO    WO 94/14114    6/1994
WO    WO 96/04745    2/1996

OTHER PUBLICATIONS

Gerard Keating et al. "The Winning Combination:object/relational solutions" pp. 64–67, 1995.*

(List continued on next page.)

*Primary Examiner*—Sue Lao
(74) *Attorney, Agent, or Firm*—Akerman Senterfitt

(57) ABSTRACT

Method and apparatus for seamlessly integrating new or modified user interface features or modified functionality, to an existing target application program (100) in the context of an operating system (102) which assigns a separate process address space for each application program then operating. The disclosed invention does not require re-compiling the existing application program's source code. Rather, a novel approach is provided which allows a technology injection system (TIS) (106) to inject itself directly between a computer operating system (102) and the target program (100) so as to intercept and act upon messages and commands to the target program (100). In this way, the TIS (106) can modify any inputs and outputs of the target program (100). By performing special processing of those messages to the target application program (100) which determine the appearance of the target application user interface or which concern modified functionality, the TIS (106) can provide the new functionality to the target application program (100) and alter the appearance of its user interface. Interception of messages between the operating system (102) and the TIS (106) is achieved by utilizing operating system functions 116, or any other available computer system functions, to overwrite a pointer (138) to a window procedure (116) of the target application (100), with a pointer to a surrogate window procedure (124).

5 Claims, 8 Drawing Sheets

U.S. PATENT DOCUMENTS

| | | |
|---|---|---|
| 5,291,585 A | 3/1994 | Sato et al. |
| 5,315,703 A | 5/1994 | Matheny et al. ............ 395/164 |
| 5,349,658 A | 9/1994 | O'Rourke et al. .......... 395/700 |
| 5,375,241 A | 12/1994 | Walsh |
| 5,381,534 A | 1/1995 | Shi |
| 5,455,904 A | 10/1995 | Bouchet et al. ............. 395/157 |
| 5,455,948 A | 10/1995 | Poole et al. |
| 5,457,798 A | 10/1995 | Alfredsson |
| 5,504,928 A | 4/1996 | Cook et al. |
| 5,547,798 A | 8/1996 | Suzuki et al. |
| 5,583,761 A | * 12/1996 | Chou ......................... 395/798 |
| 5,600,789 A | 2/1997 | Parker et al. |
| 5,870,606 A | 2/1999 | Lindsey |

OTHER PUBLICATIONS

"Windows API Bible" by James L. Conger, pp. 426, 1992.*

Jeffrey Richter—"Advanced Windows NT—The Developer's Guide to the Win32 Application Programming Interface", 1994.*

* cited by examiner

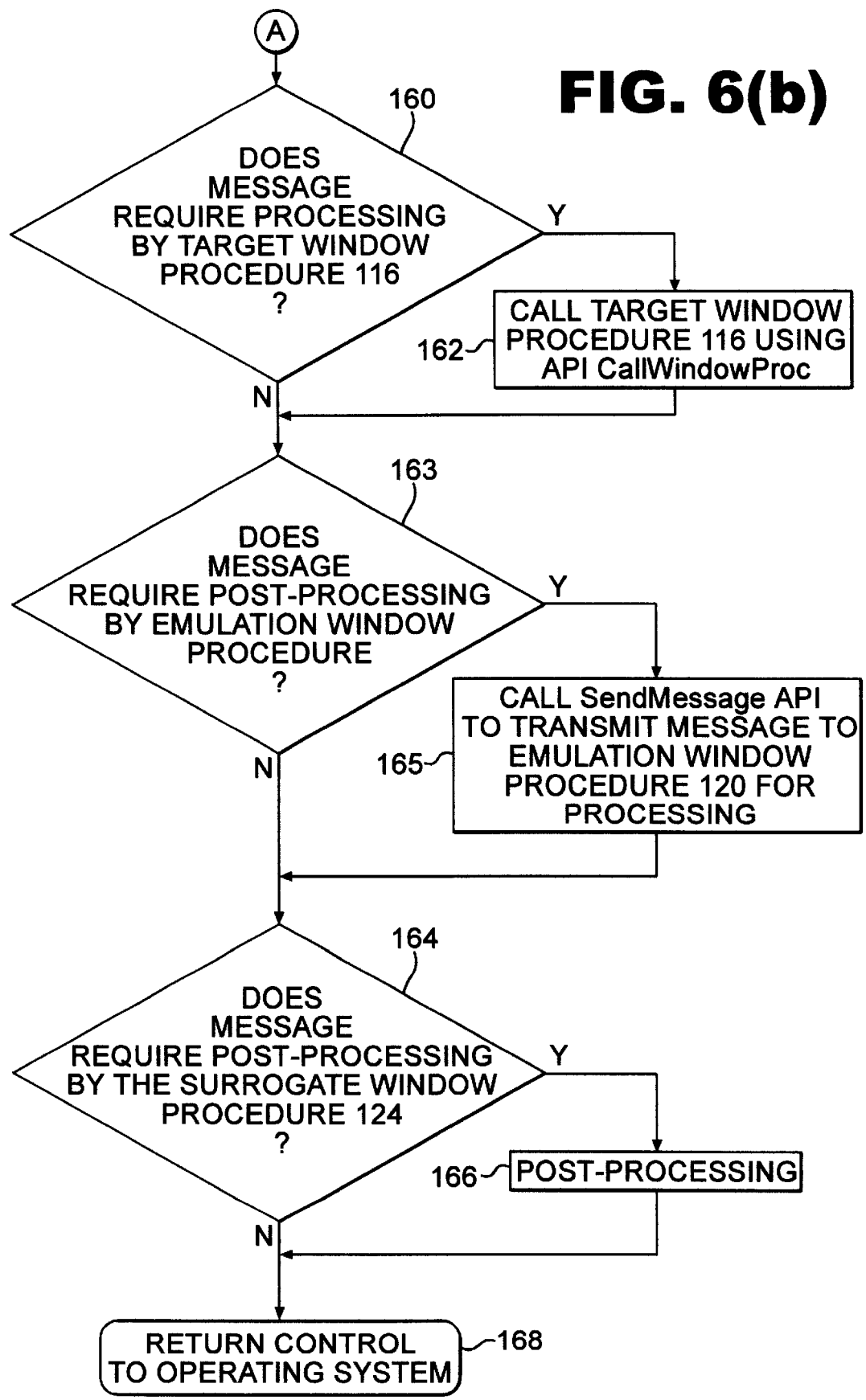

METHOD AND APPARATUS FOR SOFTWARE TECHNOLOGY INJECTION FOR OPERATING SYSTEMS WHICH ASSIGN SEPARATE PROCESS ADDRESS SPACES

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer software systems. More specifically the invention relates to the construction and implementation of a system for seamlessly injecting additional processing capabilities to an existing target software application, and injecting additional user interface features to the target application user interface, without modification of the source code for the target application.

2. Description of the Related Art

There are presently available a wide variety of computer software application programs to enable computer users to perform a various specialized task. For example, software application programs exist which can perform word processing, spread-sheet analysis, scheduling, and a multitude of other common tasks associated with business and technology. These programs are developed to satisfy certain well known requirements of a group of users, and are generally designed to offer capabilities which satisfy all of the tasks normally associated with such requirements. To this extent, the commercial application programs which are generally available to the public are quite satisfactory.

Occasionally, however, certain users may have specialized needs which have been either overlooked by software developers or which have been intentionally ignored, because implementation of functional features to address such needs has been deemed uneconomical, given the relatively small number of users who have a requirement for them. Alternatively, certain functional features may not be present in existing software applications programs because the technology to implement such features has not previously been available or is beyond the expertise of a particular software application developer. One example of a functional feature having both of the foregoing characteristics is speech recognition technology, or the ability of a software application to recognize spoken words. Speech recognition is a highly complex technology requiring significant specialized expertise on the part of the developer. On the other hand, the need or demand for this technology may not be sufficiently widespread at this time so as to provide clear economic justification for an individual computer software application developer to generally include the feature in software application products.

Where a particular commercial software developer chooses not to implement a particular product feature, such as speech recognition, in an application program, third party software developers may wish to independently provide such feature or functionality. In such cases, it would be desirable for the third party software developer to be able to develop and offer such functionality. Likewise, it would be desirable for such third party developers to be able to seamlessly integrate the new function into a graphical user interface (GUI) of the existing application's user interface. In this regard, it should be understood that, as used herein, the phrase "seamless integration" means that the user interface for the additional functionality to be added to a particular application, appears to a user to be an integrated or cohesive part of the existing software application's user interface, and not as a separate window or separate program.

Significantly, however, seamless integration of additional software functions and features within the context of an existing application's GUI creates several problems. Specifically, modification of a software application program to seamlessly implement an additional function within the context of the existing GUI generally requires access to the program's source code. This requirement can present an insurmountable obstacle to implementation of the desired feature, as software owners are often quite reluctant to allow third parties to have access to source code for an application program. At a minimum, the need to have access to a software application's source code, along with the owner's permission to modify such code, will inevitably cause delays and added expense.

Accordingly, it would be desirable to provide a method for integrating one or more new functions to an existing target application program, and for adding one or more features to a GUI of an existing software application program. It would also be desirable to provide a method and system for seamlessly injecting a new function and/or a user interface feature into an existing software application program, without access to, or modification of, the source code for such existing software application program.

SUMMARY OF THE INVENTION

This invention solves the aforementioned problems in the context of an operating system wherein each application program resides in a process address space which cannot be directly accessed by another application program. More particularly, the method provides a method and apparatus for seamlessly integrating new functionality to an existing target application program. It also permits seamless integration of modified user interface features to a GUI of an existing target application program. Significantly, the disclosed invention does not require access to the existing application program's source code in order to accomplish the foregoing results. Rather, the disclosed method and apparatus provides an approach which allows a technology injection system (TIS) to inject itself directly between a computer operating system and the target program so as to intercept messages and commands to the target program. In this way, the TIS can modify any inputs and outputs of the target program. By intercepting and then performing special processing of those messages to the target application which relate to the new functionality and/or which determine the appearance of the target application user interface, the TIS can implement the new functional features and seize control over the appearance of the interface.

Interception of messages between the operating system and the target application program is achieved by utilizing a combination of techniques which take advantage of available operating system functions, to insert a surrogate window procedure contained in a Dynamic Link Library (DLL), into the process address space of the target application program. Upon command from the TIS program, the surrogate window procedure initiates a sub-classing process whereby a pointer to the target application program's main window procedure is overwritten with a new pointer to the surrogate window procedure. Depending upon the nature of the functional or interface modifications to be implemented, such modifications may be performed directly by the surrogate window procedure, i.e. if permitted by the operating system architecture, or by an emulation window procedure residing in the TIS program. In a preferred embodiment, messages are transmitted between the primary and secondary window procedures, by manipulating existing operating system functions to overcome system architecture limitations which would normally prevent functional and user interface modifications to a target application program.

BRIEF DESCRIPTION OF THE DRAWINGS

There are presently shown in the drawings embodiments which are presently preferred, it being understood, however, that the invention is not so limited to the precise arrangements and instrumentalities shown, wherein:

FIG. 6(b) is a continuation of the flow chart of FIG. 6(a).

DETAILED DESCRIPTION OF THE INVENTION

Figure 1:
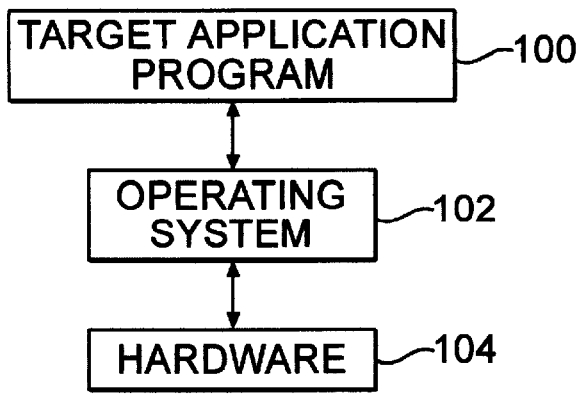
FIG. 1 is a block diagram which illustrates a basic computer architecture.

The method and apparatus as disclosed herein is particularly intended for use in conjunction with operating systems wherein each application program which may be running, resides in its own process address space, as defined by the operating system. This fact is of particular significance, as operating system architectures of this type generally do not permit one application program to share with another program the memory block allocated for the first program's particular process address space. Thus, a combination of innovative techniques must be employed to overcome the inherent limitations of such operating systems. In order to better understand the techniques employed herein, it is helpful to consider the normal interaction between an application program and an operating system of this type, such as Windows 95 or Windows NT. These operating system programs are each part of a family of Windows operating systems developed by Microsoft Corporation. Earlier versions of Windows operating systems (such as Windows 3.1) were 16-bit type systems, whereas Windows 95 and NT are 32-bit systems. For convenience, such 32-bit Windows operating systems shall hereinafter be referred to as "32-bit Windows" to distinguish them from the earlier 16-bit versions of such operating systems.

When a 32-bit Windows based application is launched, one or more windows are created by the operating system. As used herein, the term "window" should be understood as referring to an "object", i.e. a combination of code and data. The code associated with the window is referred to as a window procedure. Generally speaking, the window procedure can be located within the application program or in a dynamic link library (DLL). A DLL is a library of computer code and functions which are located in libraries, independent of the applications that use them. A DLL generally differs from an application program to the extent that it must be called from a process or application program, before it will execute.

A window procedure has two primary functions: (1) it defines what is to be displayed within a particular window's boundaries or client area on a user interface screen (such as a CRT), and (2) determines the precise manner in which the window will respond to certain user inputs. An application program may have a single window procedure or a plurality of such procedures. In any case, each window which is created by an application program is based upon a window class, which identifies the particular window procedure to be used by the window. Thus, multiple windows can be based on the same window class, and can therefore share the same window procedure.

As noted above, a window procedure determines the manner in which the window will respond to certain user inputs. In this regard, it should be noted that one of the functions performed by the window procedure is the processing of messages from the operating system, to the window. Such messages may typically include a user input event, such as that generated by a computer keyboard or a mouse, an indication that the window has been altered in size and therefore needs to be redrawn, or any other messages from the operating system or another program.

There are two basic methods by which messages are transmitted from the 32-bit Windows operating systems to an application program. According to one method, the operating system establishes a message queue for each thread associated with an application program when that application program is launched. As an aside, it should be noted that in the 16-bit family of Windows operating systems, there exists only a single execution process or "thread" for each application program. By comparison, in 32-bit Windows, a single application program can have multiple threads.

The message queue stores messages to all of the windows a program may create. A function called WinMain, which is part of all 32-bit Windows application programs, will periodically issue a command, which causes any messages left in the application message queue to be retrieved. By making use of a 32-bit Windows function or API, called "GetMessage", the application program obtains the message from the message queue. The message is then transmitted to the appropriate window procedure when the application program calls an API function named "DispatchMessage". The DispatchMessage function determines the recipient window procedure for such messages based upon a window handle assigned to the particular window procedure, which is included with the message as one of its parameters. This type of communication between the operating system and a window is called a "queued" message.

According to a second method of communication between the 32-bit Windows operating systems and an application program, messages may also be sent directly to a particular window procedure, without being placed in the message queue. These types of messages are referred to as "non-queued" messages. Queued messages are posted to a message queue while non-queued messages are sent to the window procedure. Generally, messages are either queued or non-queued, depending upon what operations they relate to. For example, queued messages are most often those which result from user input events in the form of keystrokes, mouse clicks or movements. Certain other message types which also tend to be queued include incrementation of an internal clock, repaint messages and the quit messages. Most other message types are non-queued.

When a window procedure receives a message from the operating system, it normally analyzes the message and performs any necessary processing. When it has completed such tasks, it returns control to the operating system. In those instances when an application program needs to communicate with the 32-bit Windows operating system, it generally does so by means of a call to an API function.

FIG. 1 is a block diagram which illustrates, the basic architecture of a computer, including a target application program 100, a computer operating system 102 and computer hardware 104. As shown in FIG. 1, the target application program 100 communicates with the operating system 102, which in turn communicates with the computer hardware 104.

Figure 2:
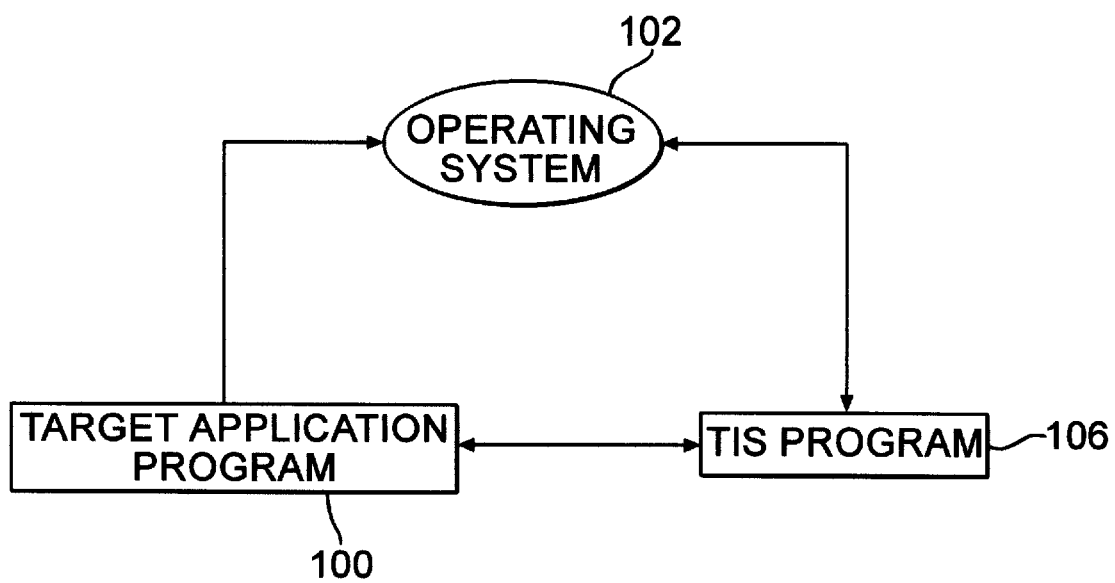
FIG. 2 is a block diagram which illustrates, in basic form, a preferred embodiment of the present invention.

FIG. 2 is a block diagram which illustrates, in basic form, the preferred interaction of the components of the present invention. As shown in FIG. 2, the technology injection system (TIS) 106, intercepts all messages (queued and non-queued) from the operating system 102, to the target application program 100, and modifies the manner in which the target application program interacts with the operating system. More particularly, upon receiving a message from the operating system 102, the TIS 106 evaluates the message to determine whether it concerns a function or GUI feature which is to be modified or implemented by the TIS program. If it is not such a message, it is transmitted to the target application program, which responds to the message and performs any requested action. If the message does concern a function or GUI feature which is to be implemented or modified by the TIS 106, then the TIS will perform any necessary processing to implement the function or user interface modification. Such processing may include requests to the target application program for the purpose of retrieving certain information or for performing a portion of the processing. In this way, the TIS 106 can seamlessly modify the target application program 100. The specific manner in which such processing is accomplished is explained below in relation to FIGS. 3–6.

Before discussing the details of the implementation of the TIS, it is helpful to note that in operating systems such as 32-bit Windows, a separate process address space is assigned for each application program which may be running. One of the limitations associated with this architecture, is that it does not permit applications to share memory locations (i.e. data pointers, function addresses, etc.) between separate process address spaces. The addresses of pointers in one process address space have no meaning to a second address space. Thus, such operating systems prevent application programs from modifying or overwriting a pointer to a window procedure contained in another program. This limitation is a fundamental obstacle to achieving the desired interaction among the operating system 102, target application 100 and TIS 106, as illustrated in FIG. 2. Accordingly, a first step in modifying the user interface or functionality of a target application program in a separate process address space environment, is to achieve some means for overwriting a pointer to the target application main window procedure, with a pointer to a surrogate window procedure associated with the TIS 106.

Figure 3:
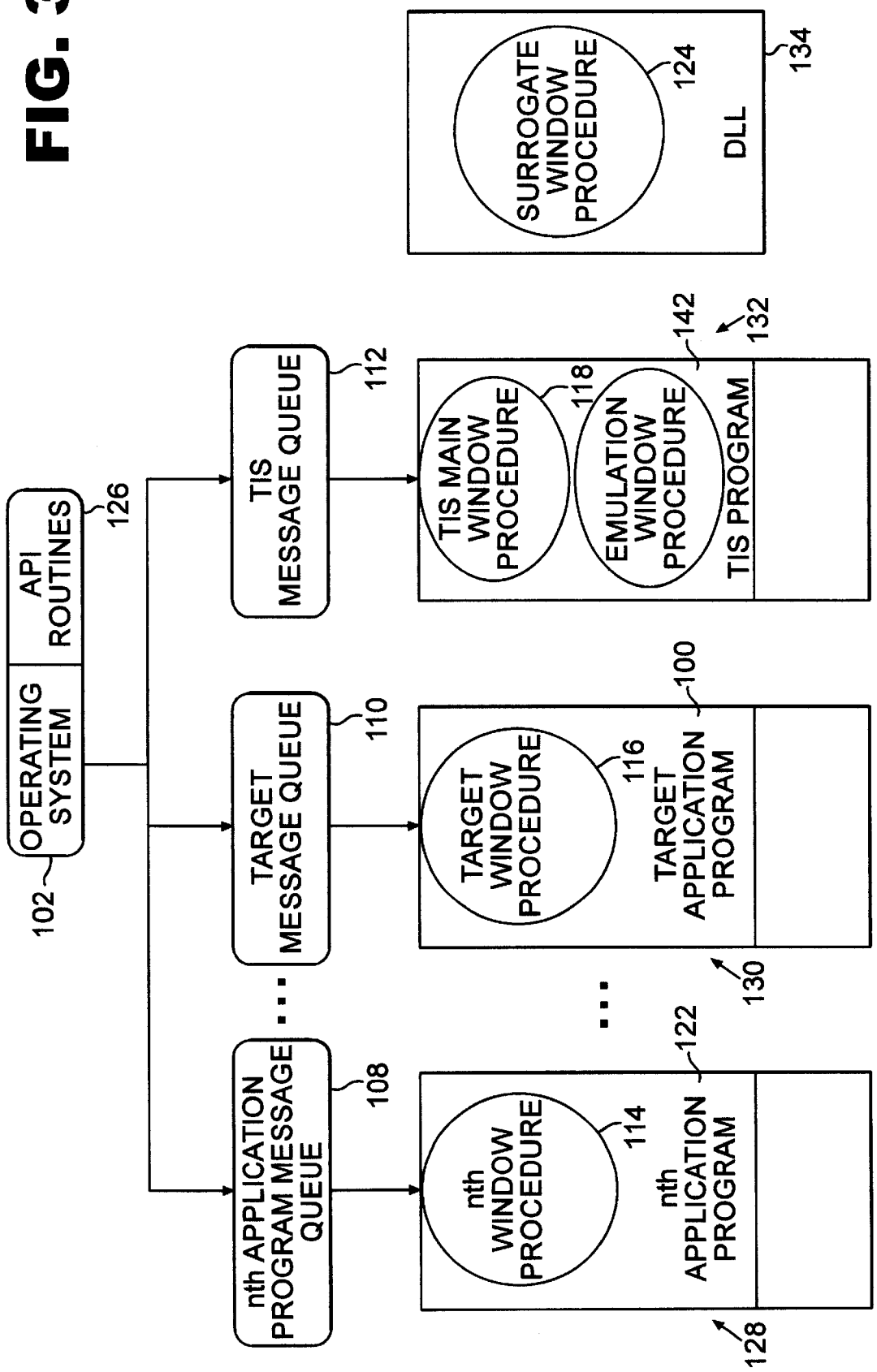
FIG. 3 is a block diagram which illustrates the normal operation of the target application program in the context of a Windows 95 or Windows NT operating system.
Figure 4:
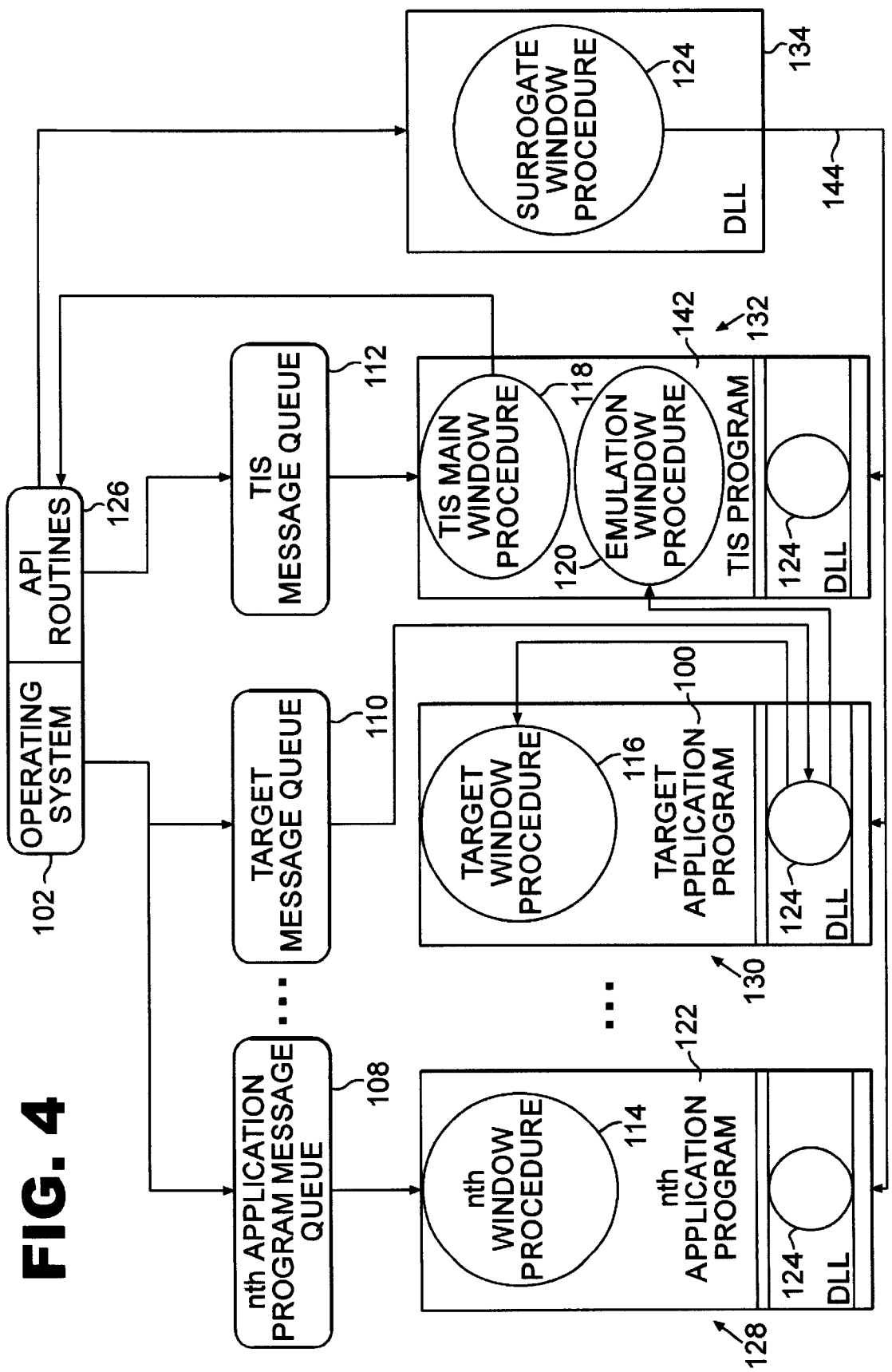
FIG. 4 illustrates the operation of a preferred embodiment of the system according to the invention.

FIGS. 3 and 4 illustrate the manner in which a surrogate window procedure is inserted into the process address space of the target application in a preferred embodiment according to the present invention. For convenience, the invention will be described in the context of a 32-bit Windows operating system. However, it should be understood that the invention is not so limited, and can be used in conjunction with other operating systems which also assign separate address spaces for application programs which are simultaneously running.

As shown in FIG. 3, the 32-bit Windows operating system 102 includes an Application Programming Interface (API) 126. In a 32-bit Windows environment, the APIs 126 consist of certain operating system functions implemented by the operating system, which are available for use by an application programmer, As an aside, it should be noted that thread message queues are not used when API functions are called. Instead, the application program's call is made to the operating system directly, and the operating system, in turn, returns the requested information directly to the application program.

FIG. 3 illustrates the normal operation of the target application program 100 relative to the operating system 102. The operating system 102 communicates with the target window procedure 116 through a target queue 110. Similarly, the operating system 102 communicates with the TIS program 142, through a TIS message queue 11 2 and with an nth application program 122 through a message queue 108. In each case, messages from the operating system are distributed from the message queues 108, 110, 112 to the appropriate window procedure within each program. Typically, an application program has one main window procedure. In FIG. 3, these are identified as nth window procedure 114, target window procedure 116, and TIS main window procedure 118.

As shown in FIG. 3, each of the application programs 100, 142, 122 reside within a separate process address space 128, 130, 132, respectively. These process address spaces are assigned by the operating system, and are not shared with respect to other application programs which may also be running. Also shown in FIG. 3 is an injection DLL 134, containing surrogate window procedure 124. Significantly, it should be noted that the TIS 106 illustrated in FIG. 2 is comprised of the combination of injection DLL 134 and TIS program 142.

As noted above, operating systems such as 32-bit Windows, which assign distinct process address spaces for each application program, do not allow one program to be sub-classed by another, i.e., they do not permit a pointer to a window procedure of a first application program to be overwritten with a pointer to a second window procedure, because the second window procedure is not contained within the process address space of the first application. Significantly, however, certain existing features of the 32-bit Windows operating system can be used in a unique way, to overcome this limitation.

Operating systems, including 32-bit Windows, often include "hooks", which may be installed in an application program through the use of an API. In the 32-bit Windows operating systems, a hook is generally understood as referring to some programming mechanism by which a programmed function can intercept events, such as messages, mouse actions, and keystrokes, before they reach an application. The function can be programmed to respond to certain events, react to events in a particular way, or to ignore them. Typically, functions that are designed to receive events are called filter functions.

A hook can be installed to a specific application program thread, or system-wide to multiple application programs. When certain system-wide hooks are installed in the context of a 32-bit Windows operating system, they will cause a designated DLL file to be mapped into the process address space of each application program then running. The present invention takes advantage of this operating system characteristic to ensure that a designated DLL is written to all threads contained within a target application program. This process enables the TIS program 142 to gain access to the target application program 100, as will now be described.

In order to insert injection DLL 134 into the process address space 130 of the target application, the TIS main window procedure 118 calls a 32-bit Windows API called "SetWindowsHookEx( )". This function is specifically made available for the purpose of adding a filter function to a hook. There are four arguments associated with the foregoing API. These include (1) a code describing the hook to attach to the filter function, (2) the filter function address, (3) the instance handle of the module containing the filter function, and (4) the thread identifier where the hook is to be installed. Of particular importance with respect to the present invention, are the arguments (1) and (4) above, which specify that the type of hook to be set, and that the hook is to be set system wide. In a preferred embodiment according to the present invention, the Set WindowsHookEx( ) API is used to set a WH_GETMESSAGE type hook. The WH_GETMESSAGE hook is designed for processing or modifying all system messages whenever a GetMessage function is called to retrieve a message from a thread message queue). The hook is specified by inserting a WH_GETMESSAGE function as parameter (1) in the WindowsHookEx( ) API. The hook is set system-wide by setting parameter (4) to zero. By setting the hook system-wide, the hook may be called in the context of any thread in the system.

In a preferred embodiment of the invention, when the SetWindowHookEx( ) API is called with a WH_GETMESSAGE parameter, it will cause the operating system 102 to map the injection DLL 134 into the process address space of each application program 100, 142, 122. This mapping, which is illustrated in FIG. 4 by mapping arrows 144, may be viewed as a side effect of installing the hook in the 32-bit Windows operating systems. The present invention takes advantage of this side effect to map new code, including surrogate window procedure 124, into the process address space 130 of the target application 100. The remaining reasons for installing the WH_GETMESSAGE hook will be explained below.

Upon command from the TIS program 142, system-wide hook procedure (WH_GETMESSAGE) overwrites an existing pointer to the target window procedure 116 with a pointer to the surrogate window procedure 124. It does so by using an available operating system API as described below. This "sub-classing" process results in all future messages to the target window procedure 116 being intercepted and dispatched to the surrogate window procedure 124 instead.

Figure 5:
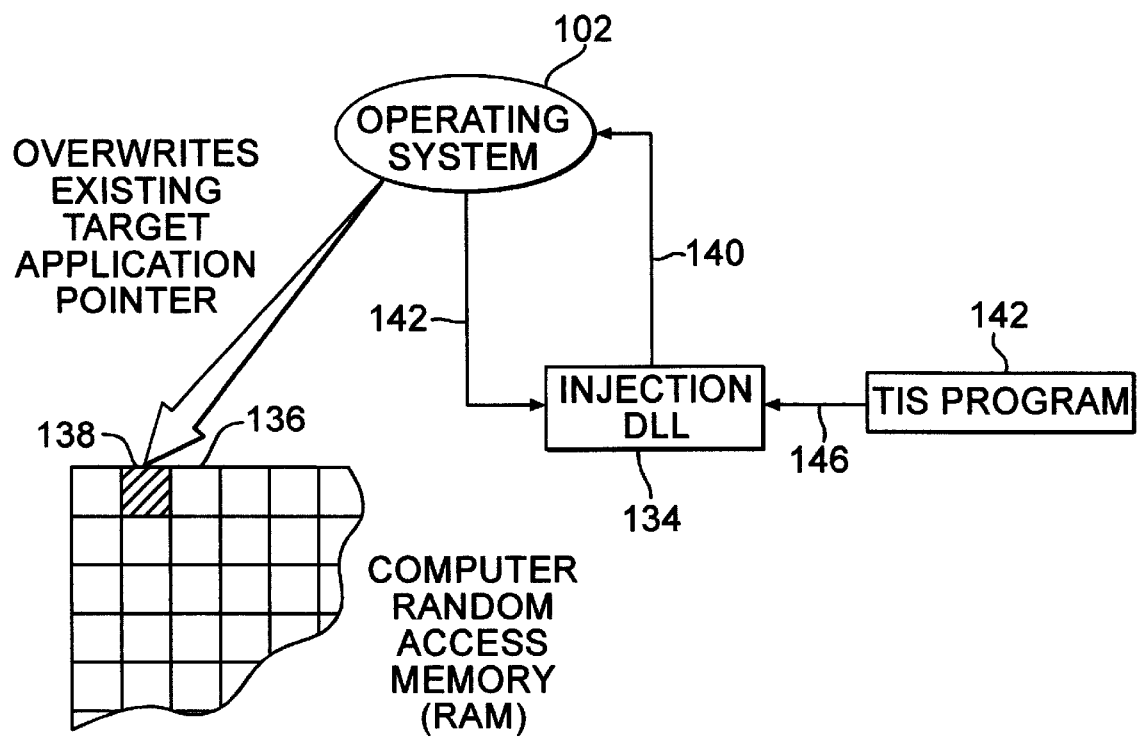
FIG. 5 is a block diagram showing how the invention overwrites a pointer to a target application program's window procedure with a new pointer, for the purpose of intercepting messages to the target application program.

The installation of the WH_GETMESSAGE hook causes injection DLL 134 to be notified of all messages and their parameters whenever a GetMessage API function is called by any application program thread to retrieve messages from its message queue. As shown in FIG. 5, the TIS program 142 initiates the sub-classing process by means of a PostMessage( ) API call 146. For convenience, in FIG. 5 an arrow is shown directly from the TIS program 142 to the injection DLL 134 to illustrate the PostMessage( ) call. It should be understood, however, that the PostMessage( ) API call is actually made from the application program, to the operating system 102, which places a message in a thread message queue for the target application.

The PostMessage( ) API call 146 includes four parameters, which include (1) a window handle (to identify the application thread to which the message is to be posted), (2) a message number, and (3, 4) two additional message specific parameters. The target application window handle may be ascertained by the TIS program by any suitable means, and the invention is not limited in this regard. For example, the TIS program may use the window handle for the window which currently has system focus. In a 32-bit Windows operating system, such focus is generally reflected by a highlighted window title bar. Such window handle can be obtained by the TIS program from the operating system. In the case of a user selected target application, the TIS program can be designed to accept a target application based upon specific inputs provided by a user.

The 32-bit Windows operating system allows the message number (item (2) above) to be defined as application specific, such that it has significance only for a particular application window procedure. Thus, according to a preferred embodiment of the invention, the process for intercepting messages to the target application may be initiated by means of a flag, in the form of a unique message number which has significance only to the surrogate window procedure.

Upon receipt of such command, the injection DLL 134 initiates the sub-classing process. Specifically, it begins by requesting from the operating system 102, the location or address in the computer's random access memory (RAM) 136 where the target window procedure 116 is located. In FIG. 5, the request for the pointer information for the target application window procedure is illustrated by function call arrow 140.

The value of pointer 138 (which identifies the address of the target window procedure) is returned to injection DLL 134, as shown by return arrow 142. Once the injection DLL has obtained the pointer value, it requests the operating system 102 to overwrite the original pointer with a replacement pointer to the TIS surrogate window procedure 124, which is contained within injection DLL 134. Significantly, by changing the pointer 138 as described above, any subsequent messages to the target window procedure 116 will be dispatched instead to the TIS surrogate window procedure 124, as mapped into the target application program process address space 130.

For the purposes of the present invention, two APIs in particular are used to modify the value of pointer 138. One API is to retrieve a pointer to the target application program's window procedure 116, and another is to cause the operating system 102 to overwrite the existing pointer with a new pointer to the surrogate window procedure 124. More particularly, the injection DLL 134 calls an API known as "GetWindowLong(hwnd,nOffset)" to get the value of the pointer 138 to the target window procedure 116. This call is shown in FIG. 5 by function call arrow 140. The hwnd parameter or "window handle" identifies the specific target application window procedure for which the pointer is sought. When the parameter nOffset is chosen to be GWL_

WNDPROC, the API GetWindowLong( ) will access the internal 32-bit Windows operating system information to determine the pointer value 138 to the target application window procedure 116. The pointer value 138 is returned to the TIS program as illustrated by return arrow 142. Once this information is received, the injection DLL 134 calls a second API, i.e., "SetWindowLong(hwnd,nOffset,nVal)". When the hwnd and nOffset parameters are set as described above, and the nVal parameter is a pointer to TIS surrogate window procedure 124, this API will cause the operating system 102 to overwrite the pointer value 138 for the original window procedure of the target ran application 116, with a new pointer value to the surrogate window procedure 124. Thus, any subsequent messages from the operating system 102 to the target window procedure 116, will be dispatched by the target application program 100, to the surrogate window procedure 124.

Depending upon the specific features to be implemented, the mapping of the injection DLL 134 into the target application program process space, by itself, may be sufficient to accomplish the goal of modifying the functionality and or user interface of the target application program. Often, however, it may be necessary to provide additional processing capabilities which cannot be implemented in the context of the injection DLL. DLL structures such as injection DLL 134 are limited by the operating system architecture as to those functions they can perform. Thus, in order to accomplish any additional necessary processing, some means must be provided to allow the surrogate window procedure 124 to send and receive messages from an external block of code residing in the TIS program 106. In a preferred embodiment according to the present invention, the external block of code for performing such additional processing is an emulation window procedure 120, residing in the process address space of the TIS program 142.

Communication of messages from the surrogate window procedure 124 to the emulation window procedure 120 is accomplished by means of a SendMessage( ) API. The SendMessage( ) API allows the emulation window procedure 120 to send a message to the surrogate window procedure 120, even though such window procedures are assigned to separate process address spaces. The SendMessage( ) API accommodates the sending of three pieces of information, namely a message type and two parameter values. The parameter values can be any type of data chosen by a programmer, but are limited to 32-bits in length and cannot be a pointer or memory address. Significantly, if the message type is chosen to be WM_COPYDATA, the SendMessage( ) API can be used to send a block of data of any size. Upon receipt of a WM_COPYDATA message, the emulation window procedure 120 will copy and decode the block of data sent from surrogate window procedure. In this way, messages and data can be communicated from the surrogate window procedure 124, to the emulation window procedure 120, whenever it is necessary for the emulation window procedure 120 to perform processing required by the surrogate window procedure 124. The same procedure may be used (where required) for sending messages from the emulation window procedure 120 to the surrogate window procedure 124.

The SendMessage API permits one value to be returned from the window procedure to which a message and/or data has been sent. In a preferred embodiment of the present invention, this value is used as a flag to the surrogate window procedure 124. The surrogate window procedure is preferably programmed so that upon return of a specific predetermined flag value, it will perform particular processing functions. For example, depending upon the flag value, the surrogate window procedure 124 may pass an intercepted message to the target window procedure 116, with or without modification, or it may simply return control to the operating system.

FIG. 4 illustrates the operation of a preferred embodiment of the system according to the invention. As shown in FIG. 4, the 32-bit Windows Operating System 114 continues to communicate normally with the TIS main window procedure 134 through the TIS message queue 112. Significantly, however, messages to the target window procedure 116 which are posted in the target message queue 110, are now dispatched to the surrogate window procedure 124 which has been mapped into the target application program process address space 130. Thus, all messages to the target window procedure 116 will be intercepted by the surrogate window procedure 124.

Figure 6A:
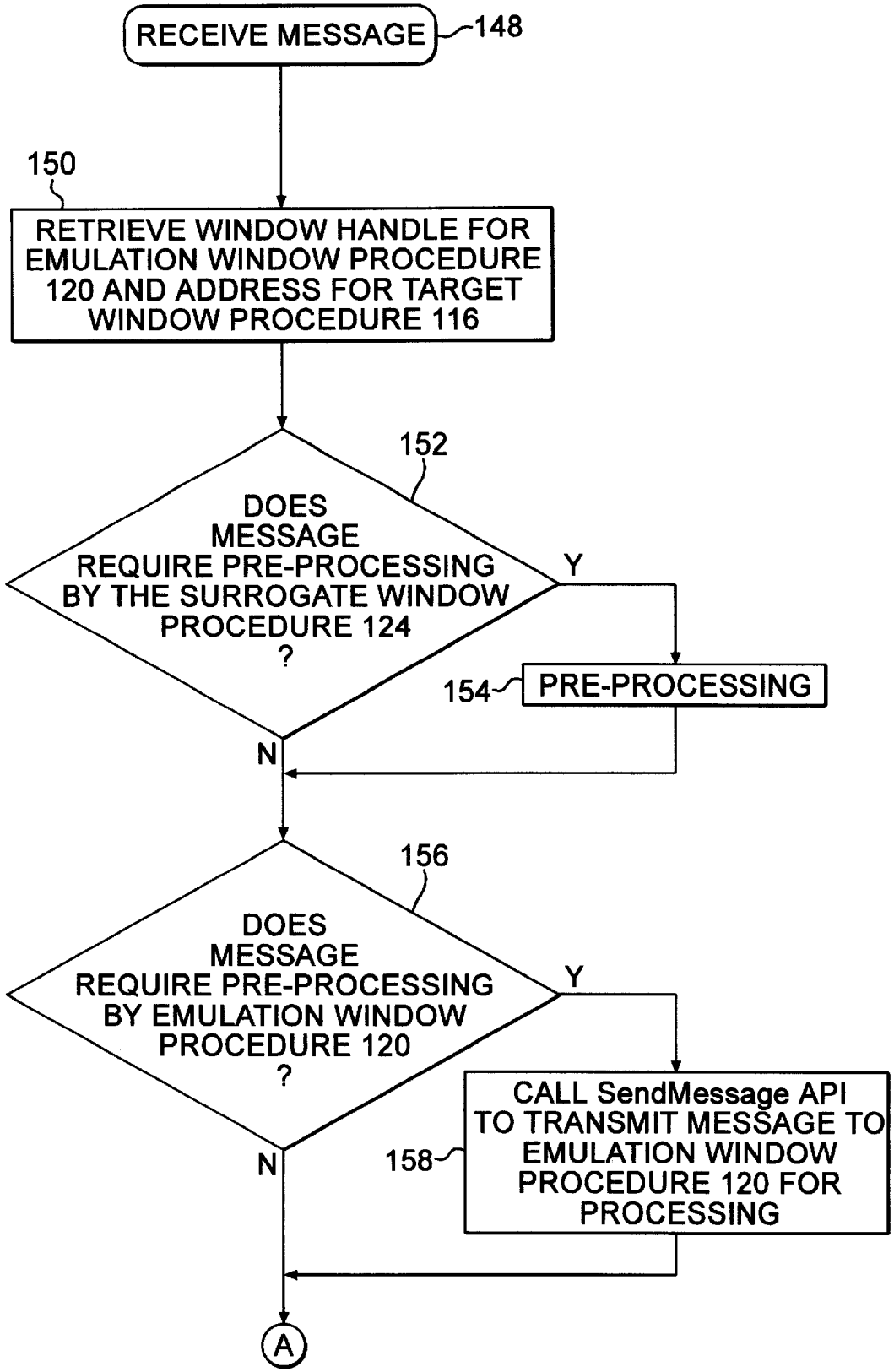
FIG. 6(a) is a flow chart for a surrogate window procedure.

FIGS. 6(a)–(b) show a flow chart which illustrates the basic operation of the surrogate window procedure 124 in a preferred embodiment. As shown in FIGS. 6(a) and (b), after an intercepted message is received in block 148, the surrogate window procedure 124 retrieves a window handle for the emulation window procedure 120 and the address of the target window procedure 116 in block 150. These attributes are preferably stored as window property values because they allow the TIS DLL to maintain the sub-classing information in an easily accessible location which is unique to each window instance. The information must be retrieved before proceeding further since it provides the necessary information for establishing a "link" between the injection DLL 134 and the TIS program 142. Once the window handle for the emulation window procedure 120 and the address of the target window procedure 116 are retrieved, the surrogate window procedure evaluates each message to determine what action should be performed. Those messages which do not concern any new functionality or the display of the window elements comprising the target application GUI user interface, are generally passed on to the target window procedure 116 by means of a "CallWindowProc( )" API in block 162. The target window procedure functions as it normally does under such circumstances by performing any necessary action, and then returns control to the surrogate window procedure 124. If no further processing is required, the surrogate window procedure 124 will then return control to the 32-bit Windows Operating System.

Alternatively, if the intercepted message does concern new functionality or user interface features to be provided by the TIS system, then any necessary pre-processing will be performed either in surrogate window procedure 124 or the emulation window procedure 156. These steps are illustrated in blocks 154 and 158 in FIG. 6(a).

Once any necessary pre-processing has been performed in blocks 154 and 158, a decision is made in block 160 as to whether it is necessary for the target window procedure 116 to perform any processing in block 162. If so, the surrogate window procedure 124 calls the target window procedure 116 by means of a CallWindowProc( ) API. Upon completion of any necessary processing by the target window procedure, control is returned to the surrogate window procedure 124. At this point, a decision will be made in step 163 as to whether any post processing needs to be performed by the emulation window procedure 120. If so, the surrogate procedure will transmit the message to the emulation window procedure 120 by using a SendMessage API, and the emulation window procedure will perform any necessary post processing. Further, a decision will be made in the surrogate window procedure 124 at block 164, as to whether any post processing is necessary in block 166. If so, the surrogate window procedure 124 performs any necessary post-processing in step 166 and then returns control to the operating system 102 at block 168. Although the target application window procedure can be called to handle part or all of the processing responsive to some operating system messages, it should be noted that the surrogate window procedure 124 and/or the emulation window procedure 120 may, in some cases, perform all necessary processing, without any call to the target application window procedure.

To better understand the foregoing process, it is helpful to consider a specific example. In particular, the operation of the TIS system with respect to a few specific messages relating to the appearance of the target application user interface will now be discussed.

A WM_NCCALCSIZE message from the operating system 102 is sent to the target application when the size and position of a window's client area need to be calculated. As an aside, it should be noted that this is a non-queued type message, and therefore does not pass through the target message que 110, but rather, is sent directly to the window procedure. Also, it should be noted that for the purposes of this specification, the term "client area" is understood to mean that portion of a window where an application displays a document, spreadsheet, database, form or other data an application is working with. In the present case, the WM_NCCALCSIZE message will not be delivered to the target window procedure 116, as originally intended, but will instead be dispatched to the surrogate window procedure 124.

When a WM_NCCALCSIZE message is received, a window procedure normally would respond by providing the operating system with window specification data. Such data typically includes information relating to the various elements comprising the window interface, such as the location and size of menus, scroll bars, client area and borders. In the present case, however, in order to make any necessary modification to the target application's main window, the surrogate window procedure 124 requires window specification data for the target application main window. This information is needed so that the original appearance of the window can be integrated with the new features or modifications to be provided. In order to obtain the window specification data, the surrogate window procedure 124 initiates an API call to the target window procedure 116. This is accomplished using the original target window procedure pointer as a call parameter in the "CallWindowProc( )" API, along with a WM_NCCALCSIZE message. This is the same pointer value which was previously overwritten by the injection DLL 134, in order to intercept messages to the target window procedure 116. Upon receipt of the "CallWindowProc( )" API containing a WM_NCCALCSIZE message, the target window procedure 116 returns to the surrogate window procedure 124, the window specification data.

For greater clarity, an arrow is shown in FIG. 4 to illustrate the CallWindowProc( ) API call from the surrogate window procedure 124 to the target window procedure 116. It should be understood, however, that this communication is actually achieved through the API routines 126 within the operating system 102, and not directly between the two programs.

Upon receipt of the window specification data by the surrogate window procedure 124, the data is edited in the surrogate window procedure to modify or add features to the existing interface, including items such as push-buttons, graphic indicators, program status indicators, icons, informational data, etc. In fact, practically any desired change to the target window interface is possible with the invention as described herein. Upon completion of any necessary changes, the modified window specification data is finally returned to the operating system 102 by the surrogate window procedure 124, in response to the original WM_NCCALCSIZE message. The modified target application window elements are then available for display by the operating system 102.

Subsequent to receiving a response to the WM_NCCALCSIZE message, the operating system 102 will typically post a WM_NCPAINT message to the target message queue 110. This message requests that the target window procedure 116 paint the window frame, i.e. those window elements surrounding the client area. This message will also be intercepted by the surrogate window procedure 124. The surrogate window procedure 124, in this case, will generally call the target window procedure 116 using a "CallWindowProc( )" API call, with a WM_NCPAINT message parameter. See FIG. 6, block 162. This action will cause the target window procedure to paint the original unmodified elements comprising the graphical user interface. When the target window procedure 116 has painted the window frame, it will return control to the surrogate window procedure 124. The emulation window procedure 120 will then preferably perform post processing in block 164, i.e., it will paint the new or modified elements of the window interface which have been left blank by the target window procedure 116.

The foregoing illustration relates to user interface modifications of the target application. However, the same techniques are applied to provide new or modified functionality to the target application program 100. Queued and non-queued messages from the operating system to the target window procedure 116 are intercepted and dispatched to the surrogate window procedure 124. If the intercepted message concerns a task which is unrelated to the new or modified functionality provided by the TIS system, then the surrogate window procedure 124 passes the message to the target application window procedure without further processing. On the other hand, if the intercepted message does concern the new or modified functionality, e.g. a mouse click on a push-button added by the TIS system, or other operating system message relating to TIS implemented functions, then the TIS system will follow the process outlined in FIGS. 6(*a*) and (*b*). Specifically, it will perform pre-processing and post processing, and call the target application window procedure in some instances to perform a portion of the processing.

Figure 7A:
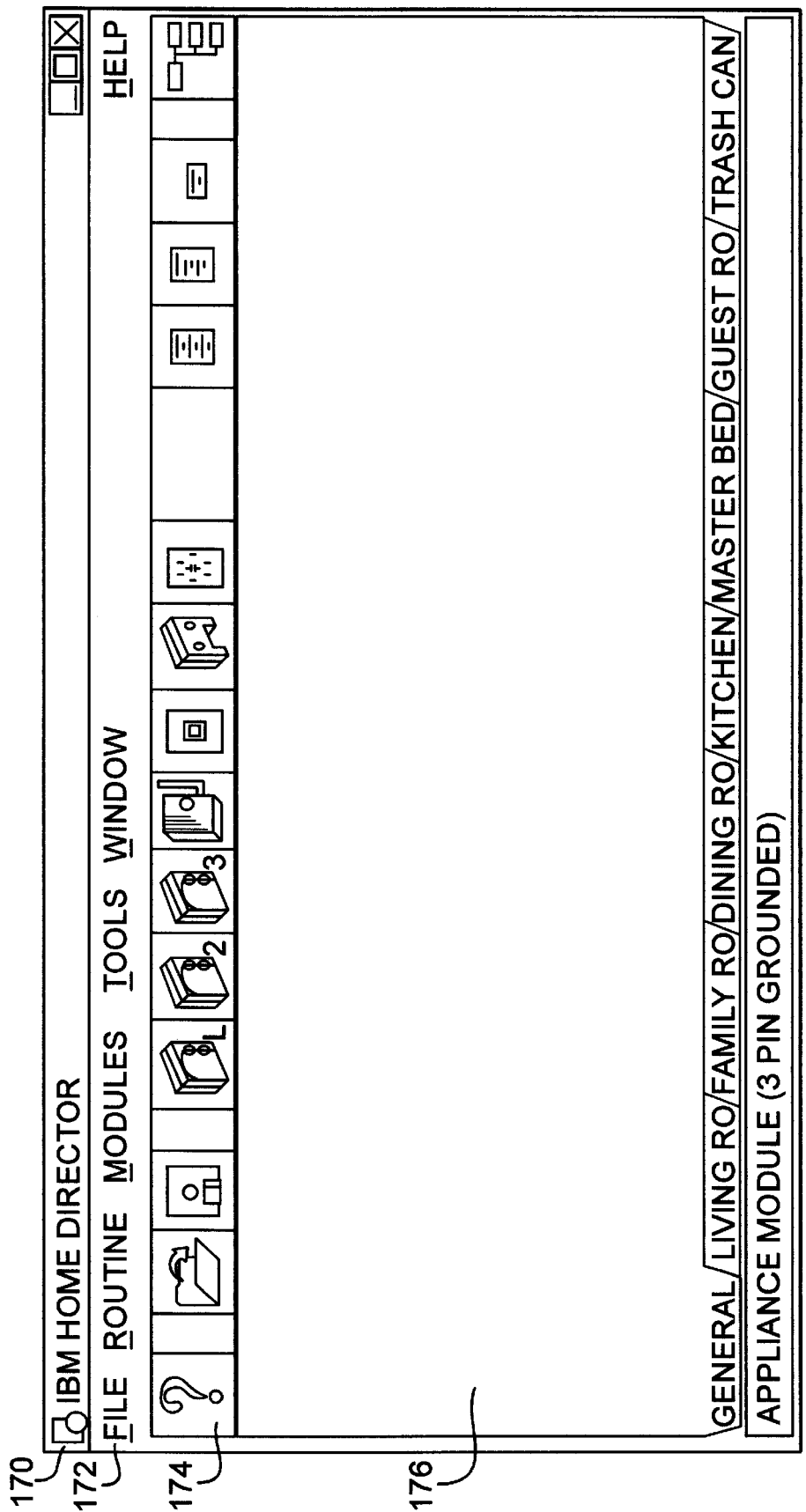
FIG. 7(a) shows a main target application program window prior to modification.

FIGS. 7(*a*) and (*b*) show one example of how a target application user interface may be modified using the present invention. FIG. 7(*a*) shows a main target application program window prior to modification. The window includes a title bar 170, a menu bar 172, a series of push-button icons 174 below the menu bar, and a client area 176 below the push-buttons. FIG. 7(*b*) shows the window in FIG. 7(*a*), after it has been modified to include additional user interface elements for a voice recognition function. As can be seen from FIG. 7(*b*), the additional user interface elements are placed, in this case, between the menu bar 172 and the push-buttons 174. The new elements in this example include an on/off button 178, a graphic volume level indicator 180, a voice prompt 182, and a corporate logo 184. The additional user interface elements 178, 180, 182, 184 are merely exemplary, and the invention is not limited in this regard. Essentially, any new user interface elements chosen by a programmer can be integrated into the target application in the method according to the present invention.

Figure 7B:
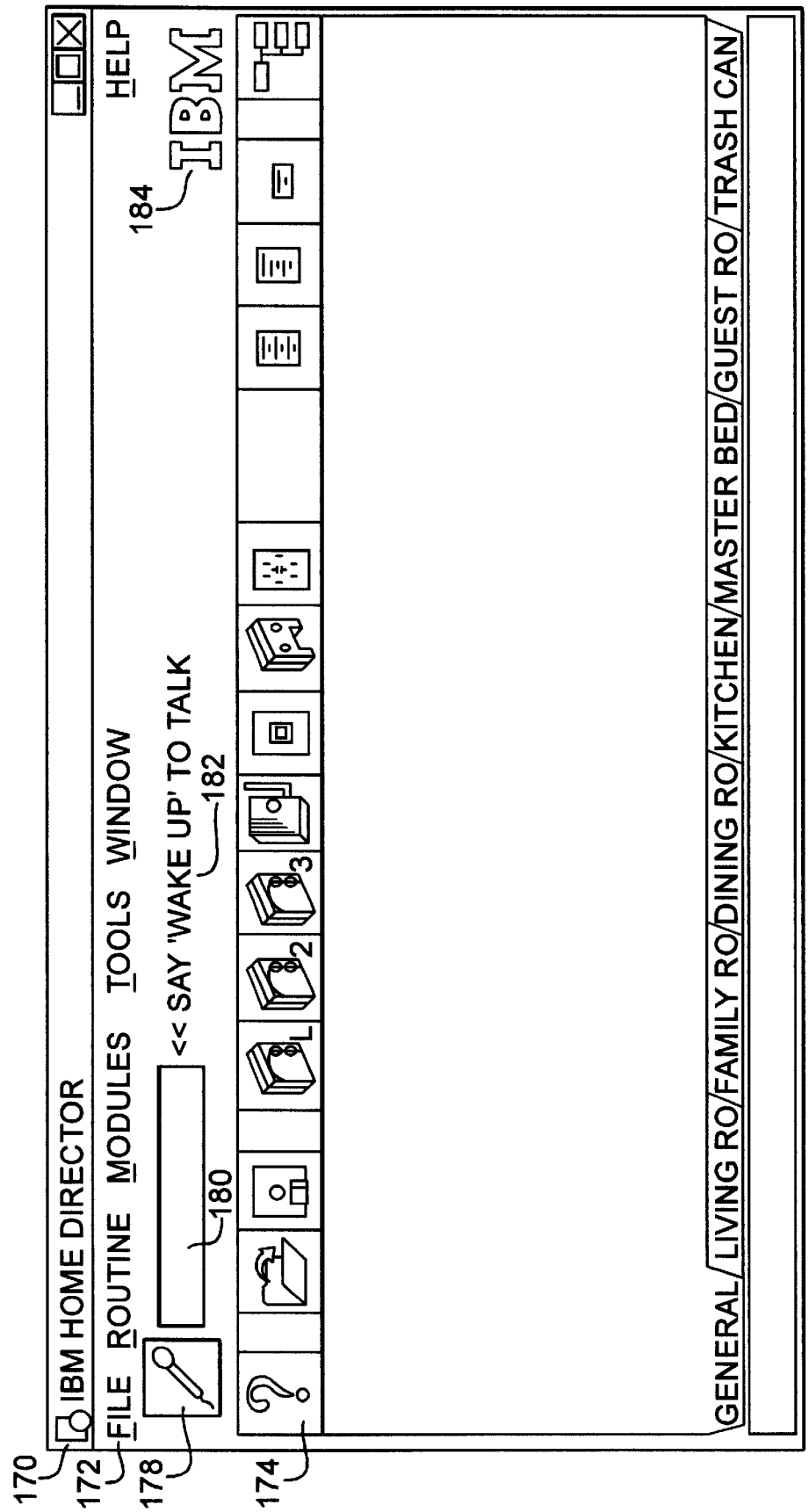
FIG. 7(b) shows a version of the window in FIG. 7(a), which has been modified to include additional user interface elements for a voice recognition function.

As can be seen from FIG. 7(b), the new interface elements are seamlessly integrated in the modified window as though they had been painted there by the target application program. In a preferred embodiment, the new or modified user interface elements provided by the surrogate window procedure are preferably painted to match the color and texture adopted in the original target application program GUI. Matching the color and texture in this manner enhances the seamless appearance of the new interface elements.

In view of the foregoing, it should be apparent that the system and apparatus according to the invention is designed to operate in conjunction with a computer system comprising a central processing unit, one or more electronic memory storage devices, and related peripheral equipment such as a data entry device (e.g., a mouse and/or keyboard) and at least one user interface unit (e.g., CRT). The central processing unit (or CPU) is electronically coupled to the one or more electronic memory storage devices, data entry device and display unit by suitable means which are well know by those of ordinary skill in this field. Similarly, the CPU can be comprised of any suitable microprocessor or other electronic processing unit as is well known to those skilled in the art. An example of such a processor would include the Pentium brand microprocessor available from Intel Corporation.

The various hardware requirements for the computer system as described herein can generally be satisfied by any one of many commercially available high speed personal computers offered by manufacturers such as Compaq, Hewlett Packard, or IBM Corp. Likewise, the system as disclosed herein can be implemented by a programmer using commercially available development tools for the operating systems described above.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a computer system, a method for modifying an operating feature of an existing target software application, said method comprising the steps of:

mapping to at least one of a plurality of application programs executing on said computer system, a library function containing a surrogate procedure, said at least one application program including said target software application;

upon command from an injection software application program, selectively causing only said library function mapped to said target software application to replace a first pointer in memory to a target procedure with a second pointer to said surrogate procedure, so that said surrogate procedure receives intercepted messages that would otherwise be received by said target procedure;

processing said intercepted messages to modify said operating feature of said target software application;

calling an emulation procedure from and external to said surrogate procedure to perform processing necessary for assisting said surrogate procedure in responding to said intercepted messages, said emulation procedure mapped to a process address space separate from a process address space mapped to said surrogate procedure; calling said target procedure from said surrogate procedure to perform any processing necessary for assisting said surrogate procedure in responding to said intercepted messages;

processing in said surrogate procedure, each of said intercepted messages to determine if each of said intercepted messages requires post-processing by said surrogate procedure after any processing by said target procedure and said emulation procedure has been completed in order to modify said operating feature of said target software application; and, retrieving from said target procedure to said surrogate procedure, graphical user interface specification data for a graphical user interface of said target software application, whenever an intercepted one of said messages is a request from said operating system for information which will determine the appearance of the target application graphical user interface.

2. The method of claim 1 wherein said graphical user interface specification data is edited by said surrogate window procedure to create a modified portion of said target application graphical user interface.

3. The method of claim 2 further comprising the steps of:

calling said target procedure from said surrogate procedure to paint a set of target graphical user interface elements, upon receipt by said surrogate procedure of a message from the operating system to paint the target application graphical user interface.

4. The method of claim 3 wherein said surrogate procedure paints said modified portion of said target application graphical user interface, before returning control to said operating system.

5. In a computer system, a method for modifying an operating feature of an existing target software application, said method comprising the steps of:

mapping to at least one of a plurality of application programs executing on said computer system, a library function containing a surrogate procedure, said at least one application program including said target software application;

upon command from an injection software application program, selectively causing only said library function mapped to said target software application to replace a first pointer in memory to a target procedure with a second pointer to said surrogate procedure, so that said surrogate procedure receives intercepted messages that would otherwise be received by said target procedure;

processing said intercepted messages to modify said operating feature of said target software application;

calling an emulation procedure from and external to said surrogate procedure to perform processing necessary for assisting said surrogate procedure in responding to said intercepted messages, said emulation procedure mapped to a process address space separate from a process address space mapped to said surrogate procedure; and, calling said target procedure from said surrogate procedure to perform any processing necessary for assisting said surrogate procedure in responding to said intercepted messages;

wherein said modified feature modifies the screen displays that are seen by the user during the operation of the target software application;

wherein said modifications to said screen displays include adding user interface elements to said target software application; and, wherein said user interface elements add a voice recognition function to said target software application.

* * * * *